United States Patent
Wang et al.

(10) Patent No.: US 11,348,291 B2
(45) Date of Patent: May 31, 2022

(54) SYSTEM AND METHOD FOR RECONSTRUCTING MAGNETIC RESONANCE IMAGES

(71) Applicant: Shanghai United Imaging Intelligence Co., LTD., Shanghai (CN)

(72) Inventors: Puyang Wang, Baltimore, MD (US); Zhang Chen, Cambridge, MA (US); Shanhui Sun, Cambridge, MA (US); Terrence Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 341 days.

(21) Appl. No.: 16/699,540

(22) Filed: Nov. 29, 2019

(65) Prior Publication Data

US 2021/0166445 A1 Jun. 3, 2021

(51) Int. Cl.
| | | |
|---|---|---|
| *G06K 9/00* | (2022.01) | |
| *G06T 11/00* | (2006.01) | |
| *G06F 17/14* | (2006.01) | |
| *G06N 3/04* | (2006.01) | |
| *G06N 3/08* | (2006.01) | |
| *G06T 3/40* | (2006.01) | |

(52) U.S. Cl.
CPC .......... *G06T 11/006* (2013.01); *G06F 17/142* (2013.01); *G06N 3/0445* (2013.01); *G06N 3/0454* (2013.01); *G06N 3/08* (2013.01); *G06T 3/40* (2013.01); *G06T 2210/41* (2013.01); *G06T 2211/424* (2013.01)

(58) Field of Classification Search
CPC ..... G06T 11/006; G06T 3/40; G06T 2210/41; G06T 2211/424; G06T 2211/428; G06F 17/142; G06N 3/0445; G06N 3/0454; G06N 3/08
USPC .......................................................... 382/131
See application file for complete search history.

(56) References Cited

U.S. PATENT DOCUMENTS

| | | |
|---|---|---|
| 10,803,631 B2 | 10/2020 | Li et al. |
| 2016/0110904 A1 | 4/2016 | Jeon et al. |
| 2020/0309883 A1 | 10/2020 | Ding et al. |
| 2020/0349680 A1 | 11/2020 | Tao et al. |

(Continued)

FOREIGN PATENT DOCUMENTS

| | | |
|---|---|---|
| CN | 108629743 A | 10/2018 |
| CN | 109658471 A | 4/2019 |

(Continued)

OTHER PUBLICATIONS

International Search Report, Application No. PCT/CN2020/131796, dated Feb. 25, 2021, 5 pages.

(Continued)

*Primary Examiner* — Charlotte M Baker (74) *Attorney, Agent, or Firm* — Ziegler IP Law Group, LLC (57) ABSTRACT

A system for reconstructing magnetic resonance images includes a processor that is configured to obtain, from a magnetic resonance scanner, sub-sampled k-space data; apply an inverse fast fourier transform to the sub-sampled k-space data to generate a preliminary image; and process the preliminary image via a trained cascaded recurrent neural network to reconstruct a magnetic resonance image.

18 Claims, 4 Drawing Sheets

(56) References Cited

U.S. PATENT DOCUMENTS

2021/0035337 A1\* 2/2021 Kim .................... G06N 3/0454

FOREIGN PATENT DOCUMENTS

| CN | 109975343 A | 7/2019 |
|----|-------------|--------|
| CN | 109993735 A | 7/2019 |

OTHER PUBLICATIONS

Notification of Transmittal of the International Search Report and Written Opinion of the International Searching Authority, Application No. PCT/CN2020/131796, dated Feb. 25, 2021, 1 page.
Written Opinion of the International Searching Authority, Application No. PCT/CN2020/131796, dated Feb. 25, 2021, 5 pages.

\* cited by examiner

SYSTEM AND METHOD FOR RECONSTRUCTING MAGNETIC RESONANCE IMAGES

FIELD

The aspects of the disclosed embodiments relate generally to magnetic resonance imaging and more specifically to reconstructing magnetic resonance images.

BACKGROUND

Magnetic Resonance Imaging (MRI) is a leading modality in medical imaging due to its non-invasiveness, lack of harmful radiation, and excellent contrast and resolution. Typically, a medical professional (for example, such as a radiologist) uses a magnetic resonance scanner to obtain detailed images of required organs and tissues within a person's body. However, MRI is associated with a relatively long image acquisition time, as compared to other medical imaging techniques, such as X-ray imaging, and ultrasound imaging. This causes patient discomfort, increases medical imaging costs, and complicates and limits use of MRI in many medical applications.

Nowadays, several approaches are being adopted and developed for reconstructing magnetic resonance images. As a first example, compressed sensing is being used to provide a framework for reconstruction of images from under-sampled data that closely approximate images derived from fully-sampled data, subject to sparsity constraints. As a second example, deep-learning techniques based on Convolutional Neural Networks (CNNs) having U-Net architecture are recently being proposed to reconstruct magnetic resonance images. A U-Net model consists of two deep Convolutional Neural Networks (CNN), a down-sampling path followed by an up-sampling path. Two CNNs are skip connected at different scales to output the final magnetic resonance image. As a third example, Convolutional Recurrent Neural Networks (CRNN) are being used to reconstruct magnetic resonance images. CRNN embed a structure of traditional iterative algorithms, thereby efficiently modelling recurrence of iterative reconstruction stages by using recurrent hidden connections over such iterations to reconstruct the magnetic resonance image.

However, existing approaches for reconstructing magnetic resonance images have certain limitations associated therewith. Firstly, some of these existing approaches are time consuming. Therefore, an acquisition time for obtaining magnetic resonance images using such approaches is considerably high. Secondly, some of these existing approaches compromise on image quality in order to reduce image acquisition time. As a result, fine image detail of the magnetic resonance image that is required to make a proper medical diagnosis may be invisible, blurred, or distorted due to artifacts.

Therefore, in light of the foregoing discussion, there exists a need to overcome the aforementioned drawbacks associated with existing approaches for reconstructing magnetic resonance images.

SUMMARY

The aspects of the disclosed embodiments are directed to providing a system and method for reconstructing magnetic resonance images. In one embodiment, the aspects of the disclosed embodiments seek to provide a solution to the existing problems of long image acquisition time and sub-optimal image quality that are associated with existing approaches for reconstructing magnetic resonance images. An aim of the aspects of the disclosed embodiments is to provide a solution that overcomes at least partially the problems encountered in prior art and provides a system that reconstructs high-quality magnetic resonance images in considerably lesser time than existing approaches for the same.

In one aspect, the aspects of the disclosed embodiments provide a system for reconstructing magnetic resonance images, the system comprising a processor configured to:

obtain, from a magnetic resonance scanner, sub-sampled k-space data;

apply an inverse fast fourier transform to the sub-sampled k-space data to generate a preliminary image; and process the preliminary image via a trained cascaded recurrent neural network to reconstruct a magnetic resonance image.

In another aspect, the aspects of the disclosed embodiments provide a method for reconstructing magnetic resonance images, the method comprising:

obtaining, from a magnetic resonance scanner, sub-sampled k-space data;

applying an inverse fast fourier transform to the sub-sampled k-space data to generate a preliminary image; and processing the preliminary image via a trained cascaded recurrent neural network to reconstruct a magnetic resonance image.

The aspects of the disclosed embodiments substantially eliminate or at least partially address the aforementioned problems in the prior art and enable speeding up a process of reconstructing magnetic resonance images without compromising on image quality, to reconstruct high-quality magnetic resonance images in short periods of time.

Additional aspects, advantages, features and objects of the aspects of the disclosed embodiments would be made apparent from the drawings and the detailed description of the illustrative embodiments construed in conjunction with the appended claims that follow.

It will be appreciated that features of the aspects of the disclosed embodiments are susceptible to being combined in various combinations without departing from the scope of the aspects of the disclosed embodiments as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the aspects of the disclosed embodiments, exemplary constructions of the disclosure are shown in the drawings. However, the aspects of the disclosed embodiments is not limited to specific methods and instrumentalities disclosed herein. Moreover, those skilled in the art will understand that the drawings are not to scale. Wherever possible, like elements have been indicated by identical numbers.

The aspects of the disclosed embodiments will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practising the aspects of the disclosed embodiments are also possible.

Figure 1:
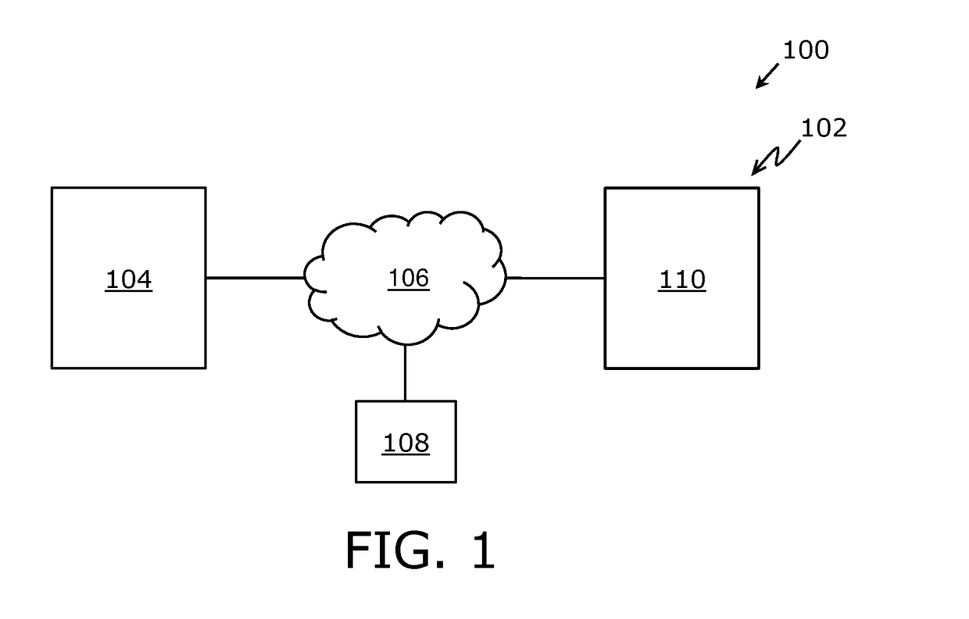
FIG. 1 is a schematic illustration of an environment wherein a system for reconstructing magnetic resonance images is implemented, in accordance with the aspects of the disclosed embodiments.

Referring to FIG. 1, illustrated is a schematic illustration of an environment 100 wherein a system 102 for reconstructing magnetic resonance images is implemented, in accordance with the aspects of the disclosed embodiments. The environment 100 includes a magnetic resonance scanner 104 that is communicably coupled to the system 102 via a communication network 106, and at least one user device (depicted as a user device 108) associated with a user of the system 102.

The magnetic resonance scanner 104 is a specialized radiology equipment that uses strong magnetic fields and radio waves for imaging organs of a body. It will be appreciated that the environment 100 depicts a single magnetic resonance scanner 104 coupled in communication with the system 102 for sake of simplicity only. In practice, a plurality of magnetic resonance scanners could be coupled in communication with the system 102.

The communication network 106 is wired, wireless, or any combination thereof. It will be appreciated that the communication network 106 can be an individual network, or a collection of individual networks that are interconnected with each other to function as a single large network. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks.

Hereinabove, the term "at least one user device" refers to "a single user device" in some implementations, and "a plurality of user devices" in other implementations. Examples of a given user device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, and a desktop computer. Notably, the at least one user device 108 is coupled in communication with the system 102, via the communication network 106. It will be appreciated that the environment 100 depicts a single user device 108 coupled in communication with the system 102 for sake of simplicity only. In practice, a plurality of user devices associated with a plurality of users could be coupled in communication with the system 102.

Optionally, the at least one user device 108 is integrated with the magnetic resonance scanner 104.

The system 102 comprises a processor 110. Throughout the present disclosure, the term "processor" refers to an arrangement of at least one processing unit that is configured to perform the aforementioned processing steps to reconstruct magnetic resonance images. The term "processor" generally refers to an application, program, process or device in a client-server relationship that responds to requests for information or services by another application, program, process or device (a client) on a communication network. The term "processor" also encompasses software that makes the act of serving information or providing services possible.

It will be appreciated that the processor 110 can be implemented in several ways. In one embodiment, the processor 110 comprises a single processing unit. In another embodiment, the processor 110 comprises a plurality of processing units. In such a case, the plurality of processing units could have a distributed architecture.

In an example, the processor 110 may comprise a first processing unit (namely, a "front-end processing unit") that is directly coupled in communication with a given user device 108, and at least one processing unit (namely, at least one "back-end processing unit") that is coupled in communication to the first processing unit. In operation, the first processing unit can be accessed by the user (for example, such as a radiologist, a nurse, a doctor, and the like) using the at least one user device 108, via the communication network 106. Furthermore, in such a case, the at least one back-end processing unit, either alone, or in combination with the front-end processing unit, could implement the processing steps for reconstructing magnetic resonance images.

In another example, the processor 110 may be implemented by way of a cloud-based processor.

The processor 110 is configured to:

obtain, from the magnetic resonance scanner 104, sub-sampled k-space data;

apply an inverse fast fourier transform to the sub-sampled k-space data to generate a preliminary image; and process the preliminary image via a trained cascaded recurrent neural network to reconstruct a magnetic resonance image.

Throughout the present disclosure, the term "sub-sampled k-space data" refers to a portion of raw k-space data that is obtained upon sub-sampling the raw k-space data. Herein, the term "raw k-space data" refers to a complex valued matrix representing a fourier transformation of an underlying imaged region that is imaged using the magnetic resonance scanner 104. The raw k-space data is produced by the magnetic resonance scanner 104 and can be understood to be "fully-sampled k-space data". The raw k-space data cannot be visualized and interpreted by humans in its unprocessed (namely, raw) form.

Optionally, when training the trained cascaded recurrent neural network, the processor 110 is configured to obtain the raw k-space data from the magnetic resonance scanner 104, and sub-sample the raw k-space data to obtain the sub-sampled k-space data. The fully-sampled k-space data (namely, the raw k-space data) and the sub-sampled k-space data form a pair of raw input and ground truth for the processor 110. Optionally, the processor 110 obtains the raw k-space data in real time or near-real time.

Optionally, the raw k-space data is sub-sampled by sampling the raw k-space data at a sampling density that is lesser than a full sampling density of the fully-sampled k-space data. Notably, such sub-sampling reduces a number of k-space data points that are to be subsequently processed by the system. Such sub-sampling techniques are well-known in the art.

It will be appreciated that the processor directly obtains the sub-sampled k-space data from the magnetic resonance scanner 104 in order to reduce acquisition time (namely, reconstruction time) for obtaining the magnetic resonance images.

It will be appreciated that applying the inverse fast fourier transform to the sub-sampled k-space data allows processing to move from k-space into image space (which is better comprehensible to the user), as upon applying the inverse fast fourier transform to the sub-sampled k-space data, the preliminary image is generated. As computations for the inverse fast fourier transform are less, using the inverse fast fourier transform enables reduction of the acquisition time for obtaining the magnetic resonance images using the system 102.

Alternatively, optionally, the processor 110 is configured to apply an inverse discrete fourier transform to the sub-sampled k-space data to generate the preliminary image.

Optionally, the processor 110 is configured to train the cascaded recurrent neural network. Upon the training, the trained cascaded recurrent neural network is obtained. It will be appreciated that the cascaded recurrent neural network is trained via supervised learning. Notably, the processor 110 feeds exemplary input-output pairs (wherein exemplary sub-sampled k-space data serves as input and exemplary magnetic resonance images serve as output) to the cascaded recurrent neural network, and uses at least one supervised learning algorithm for analyzing the exemplary input-output pairs (namely, training data) to produce an inferred function for the cascaded recurrent neural network. The trained cascaded recurrent neural network then uses this inferred function to produce the magnetic resonance images for new sub-sampled k-space data. Moreover, this learning-based approach for reconstructing the magnetic resonance images provides substantial performance improvement with respect to conventional equipment when a large set of exemplary input-output pairs is used for training.

Optionally, the trained cascaded recurrent neural network is a deep learning-based cascaded recurrent neural network.

It will be appreciated that the magnetic resonance image that is reconstructed upon processing the preliminary image via the trained cascaded recurrent neural network has a similar image quality as an image that would have been reconstructed by processing the raw k-space data. In other words, even though the magnetic resonance image is generated using sub-sampled k-space data, the image quality of the magnetic resonance image is comparable to an image quality of the image which would have been reconstructed by processing the raw k-space data. Moreover, since the sub-sampled k-space data is smaller in magnitude as compared to the raw k-space data, the acquisition time for obtaining the magnetic resonance images using the system 102 is considerably lesser than conventional systems for the same purpose. Therefore, the system 102 beneficially allows for reconstructing high-quality magnetic resonance images in less magnetic resonance image acquisition time, as compared to the aforesaid conventional systems.

Figure 2:
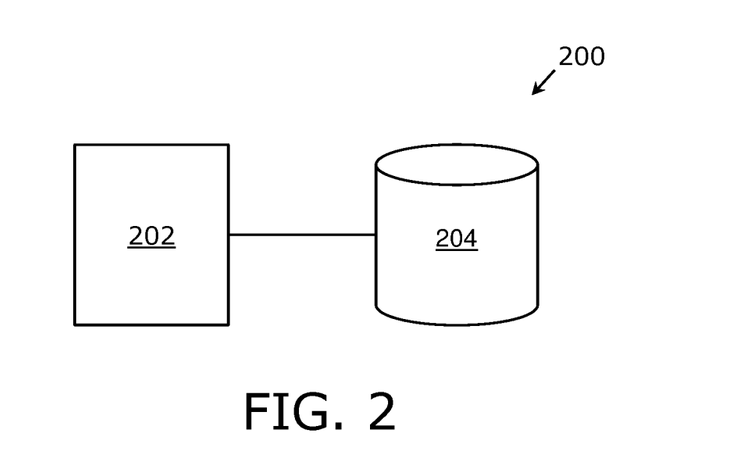
FIG. 2 is a schematic illustration of a system for reconstructing magnetic resonance images, in accordance with the aspects of the disclosed embodiments.

Referring to FIG. 2, illustrated is a schematic illustration of a system 200 for reconstructing magnetic resonance images, in accordance with aspects of the disclosed embodiments. The system 200 comprises a processor 202 and a database arrangement 204 coupled in communication with the processor 202, wherein the database arrangement 204 is configured to store at least the magnetic resonance image that is reconstructed by the processor 202.

It will be appreciated that the database arrangement 204 acts as a data repository associated with the system 200. The term "database" generally refers to hardware, software, firmware, or a combination of these for storing information in an organized (namely, structured) manner, thereby, allowing for easy storage, access (namely, retrieval), updating and analysis of such information. The term "database" also encompasses database processors that provide the aforesaid database services to the system 200.

Figure 3:
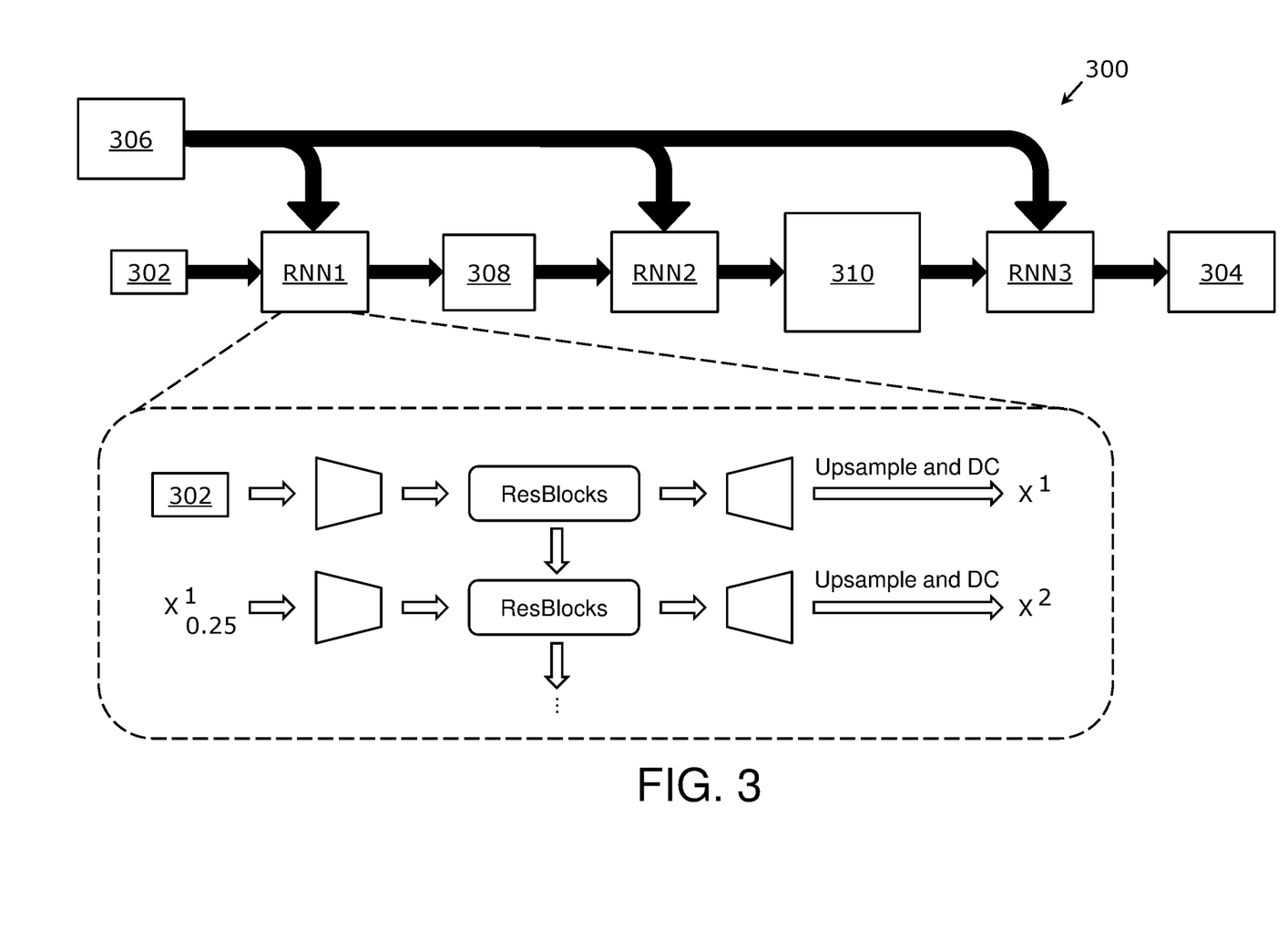
FIG. 3 illustrates exemplary processing steps of a trained cascaded recurrent neural network, in accordance with the aspects of the disclosed embodiments.

Referring to FIG. 3, illustrated are exemplary processing steps of a trained cascaded recurrent neural network 300, in accordance with aspects of the disclosed embodiments. As shown, a preliminary image 302 is processed via the trained cascaded recurrent neural network 300 to reconstruct a magnetic resonance image 304. The preliminary image 302 is generated by applying an inverse fast fourier transform to sub-sampled k-space data 306. The trained cascaded recurrent neural network 300 includes 3 recurrent neural networks RNN1, RNN2, and RNN3 connected in a cascaded manner.

Optionally, the trained cascaded recurrent neural network is associated with at least one image scale, and wherein, for a given image scale of the at least one image scale, a given recurrent neural network recursively reconstructs the preliminary image by extracting image features from a given image and using the extracted image features to modify the preliminary image. In this manner, reconstruction of the magnetic resonance image is implemented in a progressive way using a cascade of recurrent neural networks.

In an embodiment, the trained cascaded recurrent neural network is associated with a single image scale. In such a case, the magnetic resonance image would have a same size as that of the preliminary image. Moreover, in this case, a single recurrent neural network is configured to:

iteratively reconstruct the preliminary image by extracting image features from intermediate images generated during iterative processing performed by the single recurrent neural network; and use the extracted image features to modify the preliminary image for reconstructing the magnetic resonance image.

In another embodiment, the trained cascaded recurrent neural network is associated with a plurality of image scales, one recurrent neural network being associated with one image scale, and wherein recurrent neural networks associated with different image scales are serially connected in increasing order of image scales associated therewith. In other words, the recurrent neural networks associated with different image scales are connected in an ascending order of their image scales. It will be appreciated that reconstruction of the magnetic resonance image using recurrent neural networks associated with increasing image scales allows for progressively adding more image detail to sub-sampled images generated as outputs of these recurrent neural networks as these sub-sampled images are processed by each recurrent neural network. In this manner, recurrent neural networks at each image scale are utilized efficiently to yield an extremely accurate reconstruction of the magnetic resonance image.

Throughout the present disclosure, the term "sub-sampled image" refers to an image that is produced as an output of a given recurrent neural network. Depending on a number of recurrent neural networks that are employed in the trained cascaded recurrent neural network, a number of sub-sampled images also varies. As an example, when a given trained cascaded recurrent neural network includes 4 recurrent neural networks, 3 sub-sampled images would be generated as outputs of first, second and third recurrent neural networks among the 4 recurrent neural networks. An output of fourth recurrent neural network among the 4 recurrent neural networks would be the magnetic resonance image. As another example, when a given trained cascaded recurrent neural network includes only a single recurrent neural network, the sub-sampled image of the single recurrent neural network would be the reconstructed magnetic resonance image.

Moreover, the term "intermediate image" refers to images that are generated during iterative processing steps performed by a given recurrent neural network while processing an input image. Notably, an intermediate image generated as an output of an nth processing iteration performed by the given recurrent neural network acts as an input for an (n+1)th processing iteration. At the end of the (n+1)th processing iteration, a next intermediate image would be generated. It will be appreciated that a last intermediate image that is generated as an output of at a last processing iteration of the given recurrent neural network is the sub-sampled image of the given recurrent neural network.

Optionally, an output of a given recurrent neural network associated with a first image scale is serially fed as an input for a given recurrent neural network associated with a second image scale, the second image scale being subsequent to and greater than the first image scale.

For example, as shown in FIG. 3, the trained cascaded recurrent neural network 300 is associated with 3 image scales. As indicated, image scales of the preliminary image 302 are from low resolution to high resolution. In the cascaded recurrent neural network 300, the RNN1 is associated with image scale IS1, the RNN2 is associated with image scale IS2, and the RNN3 is associated with image scale IS3. Moreover, the image scale IS1 is smaller than the image scale IS2, and the image scale IS2 is smaller than the image scale IS3. As shown, the recurrent neural networks RNN1-RNN3 are serially connected in increasing order of image scales IS1-IS3 associated therewith. Moreover, an output 308 (notably, a first sub-sampled image) of the RNN1 associated with the image scale IS1 is serially fed as an input for the RNN2 associated with the image scale IS2, the image scale IS2 being subsequent to and greater than the image scale IS1. Likewise, an output 310 (notably, a second sub-sampled image) of the RNN2 associated with the image scale IS2 is serially fed as an input for the RNN3 associated with the image scale IS3, the image scale IS3 being subsequent to and greater than the image scale IS2.

Optionally, a given recurrent neural network (RNN) within the trained cascaded recurrent neural network is a convolutional recurrent neural network (CRNN). When, for example, the trained cascaded recurrent neural network is based on fully convolutional neural networks, any arbitrary a size of input to the trained cascaded recurrent neural network is allowable and can be processed efficiently.

Optionally, before a given RNN or after a given RNN, the trained cascaded recurrent neural network comprises at least one layer of convolution operation. Alternatively, optionally, before a given RNN or after a given RNN, the trained cascaded recurrent neural network comprises a sub-neural network.

Optionally, a number of iterations of a given recurrent neural network are configurable. When a short acquisition time is desired for obtaining the magnetic resonance images using the system (102, 200) the number of iterations are reduced, and vice versa.

Optionally, the processor (110, 202) is further configured to add at least one data consistency (DC) layer after each iteration of a given recurrent neural network. The at least one data consistency layer ensures data consistency in k-space between the reconstructed magnetic resonance image and intermediate images. This yields a high-quality magnetic resonance image based on the sub-sampled k-space data, with fast computing time. Notably, the data consistency in k-space is enforced to minimize artifacts in the reconstructed magnetic resonance image.

Optionally, to add a given data consistency layer, the processor (110,202) is configured to:

up-sample a size of a given intermediate image to a size of the preliminary image, the given intermediate image being generated as a result of a given iteration of the given recurrent neural network;

apply a fast fourier transform to the given intermediate image;

replace k-space values corresponding to the given intermediate image using values from the raw k-space data to derive a resultant set of k-space values; and apply an inverse fast fourier transform to the resultant set of k-space values to generate a next intermediate image.

It will be appreciated that the sub-sampled k-space data (which is the observed k-space data from the magnetic resonance scanner 104) has a same size as the preliminary image. Therefore, the size of the given intermediate image is up-sampled to correspond to the size of the preliminary image.

Optionally, the k-space values corresponding to the given intermediate image are replaced with a weighted sum of the k-space values corresponding to the given intermediate image and k-space values from the raw k-space data that correspond to the given intermediate image. In the weight sum, at least one weight is used, the at least one weight being learnt (namely, inferred) by the cascaded recurrent neural network during its training.

As an example, in FIG. 3, processing of the RNN1 is depicted in expanded form. The preliminary image 302, which is an input to the RNN1, undergoes several iterations of processing at the RNN1. For sake of simplicity, only 2 iterations are shown in the FIG. 3. As shown, towards the end of every iteration, there is shown an 'Upsample and DC' step which is indicative of addition of a given data consistency layer. A block labelled "ResBlocks" indicates a basic recursive neural network cell. A right-facing trapezium (before the ResBlocks block) is indicative of deconvolution operation whereas a left-facing trapezium (after the ResBlocks block) is indicative of convolution operation.

Optionally, the processor is configured to up-sample or down-sample a given image, wherein:

the up-sampling is performed using interpolation, or pooling operation, or transpose convolution operation with a given stride, whereas the down-sampling is performed using interpolation, or pooling operation, or convolution operation with a given stride.

Optionally, in this regard, the interpolation is bilinear interpolation. As an example, In the trained cascaded recurrent neural network 300, down-sampling and up-sampling operations are performed using bilinear interpolation.

It will be appreciated that the term "stride" refers to a contracting factor (in case of down-sampling) and to an expanding factor (in case of up-sampling).

Figure 4:
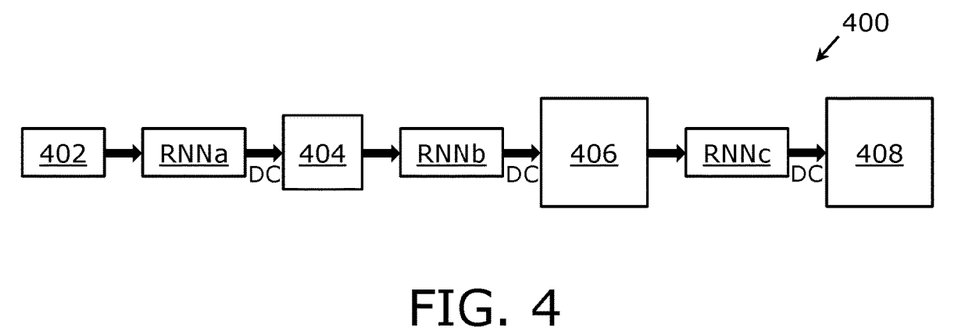
FIG. 4 is an illustration of a simplified three-scale trained cascaded recurrent neural network that utilizes k-space data consistency, in accordance with the aspects of the disclosed embodiments.

Referring to FIG. 4, illustrated is a simplified three-scale trained cascaded recurrent neural network 400 that utilizes k-space data consistency, in accordance with aspects of the disclosed embodiments. The cascaded recurrent neural network 400 includes 3 recurrent neural networks RNNa, RNNb, and RNNc that are associated with 3 image scales. Notably, the at least one data consistency layer is added after each iteration of each recurrent neural network of the three-scale trained cascaded recurrent neural network 400. A preliminary image 402 is processed by the three-scale trained cascaded recurrent neural network 400 to yield sub-sampled images 404 and 406, and the magnetic resonance image 408.

Figure 5:
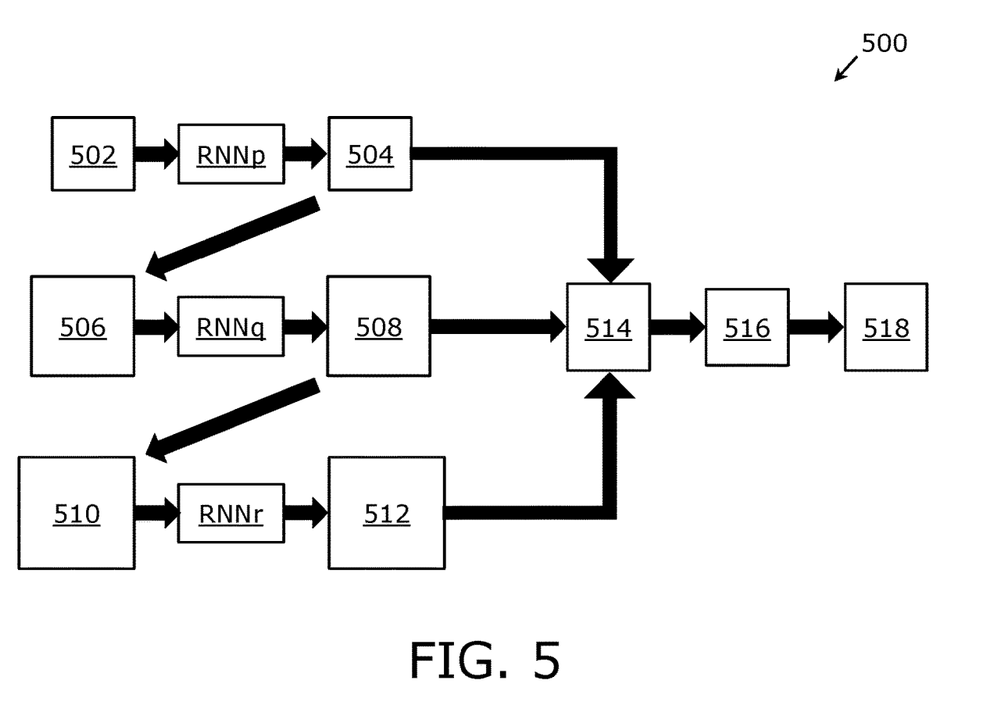
FIG. 5 is an illustration of another exemplary trained cascaded recurrent neural network, in accordance with the aspects of the disclosed embodiments.

Referring to FIG. 5, illustrated is another exemplary trained cascaded recurrent neural network 500, in accordance with an embodiment of the aspects of the disclosed embodiments. The cascaded recurrent neural network 500 includes 3 recurrent neural networks RNNp, RNNq, and RNNr, which are associated with 3 image scales. In the cascaded recurrent neural network 500:

an input and an output of the recurrent neural network RNNp are images 502 and 504, respectively;

an input and an output of the recurrent neural network RNNq are images 506 and 508, respectively; and an input and an output of the recurrent neural network RNNr are images 510 and 512, respectively.

Moreover, in the trained cascaded recurrent neural network 500, at least one data consistency layer (not shown) is added after each iteration of a given recurrent neural network.

Optionally, the output of the given recurrent neural network associated with the first image scale is concatenated with the output of the given recurrent neural network associated with the second image scale to yield a combined output, the combined output being fed as an input into at least one convolutional neural network. Optionally, in this regard, an output of the at least one convolutional neural network is the reconstructed magnetic resonance image.

As shown for example, in FIG. 5, the output 504 of the recurrent neural network RNNp, the output 508 of the recurrent neural network RNNq, and the output 512 of the recurrent neural network RNNr are concatenated to yield a combined output 514. The combined output 514 is fed as an input into a convolutional neural network 516. An output of the convolutional neural network 516 is a magnetic resonance image 518. The output 504 is a sub-sampled image of the recurrent neural network RNNp, the output 508 is a sub-sampled image of the recurrent neural network RNNq, and output 512 is a sub-sampled image of the recurrent neural network RNNr.

Figure 6:
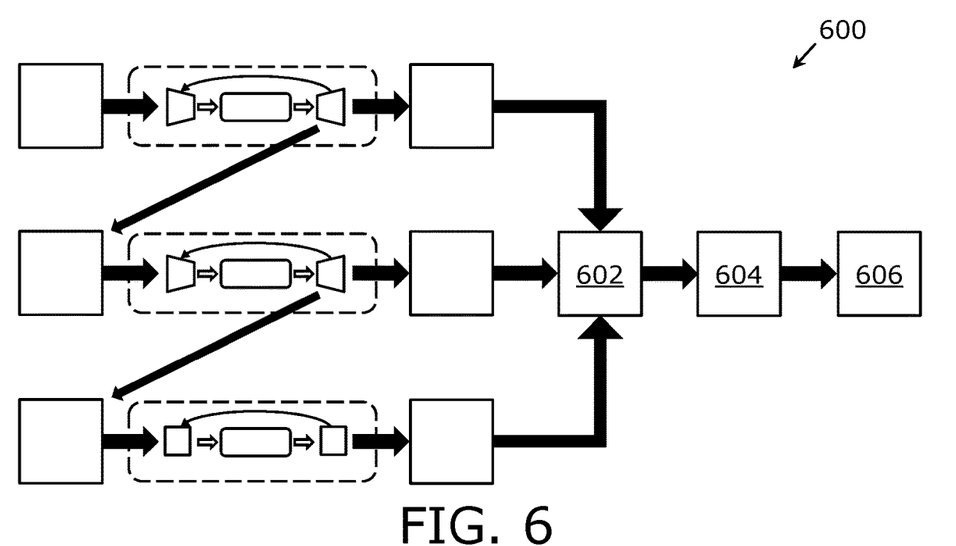
FIG. 6 is an illustration of yet another exemplary trained cascaded recurrent neural network, in accordance with the aspects of the disclosed embodiments.

Referring to FIG. 6, illustrated is yet another exemplary trained cascaded recurrent neural network 600, in accordance with an embodiment of the aspects of the disclosed embodiments. In the trained cascaded recurrent neural network 600, up-sampling operation is performed using transpose convolution operation with a given stride, whereas down-sampling operation is performed using convolution operation with a given stride. In this way, image resizing operations become learnable.

As an example, when a given image is to be resized to one-fourth of its original size, the processor (110, 202) may apply a convolution operation with stride 4, or two layers of convolution operations with stride 2 respectively, to the given image. Likewise, when the given image is to be resized to four times its original size, the processor (110, 202) may apply a transpose convolution operation with stride 4, or two layers of transpose convolution operations with stride 2 respectively, to the given image. Alternatively, when the given image is to be resized to half of its original size, the processor (110, 202) may apply a convolution operation with stride 2, and when the given image is to be resized to twice its original size, the processor (110, 202) may apply a transpose convolution operation with stride 2.

In the trained cascaded recurrent neural network 600 of FIG. 6, there are cascaded recurrent neural networks corresponding to three image scale-based reconstruction. In the first image scale, before recurrent neural network-based processing, there are applied two convolution operations with stride 2 respectively; and after the recurrent neural network-based processing, there are applied two transpose convolution operations with stride 2 respectively. This corresponds to ¼ image scale. In the second scale, there is applied one convolution operation with stride 2 before the recurrent neural network-based processing, and there is applied one transpose convolution operation with stride 1 after the recurrent neural network-based processing. This corresponds to ½ image scale. In the third scale, there is applied one convolution operation with stride 1 before the recurrent neural network-based processing. This corresponds to scale 1. Moreover, at least one data consistency layer is added after each iteration of a given recurrent neural network of the trained cascaded recurrent neural network 600. However, in the trained cascaded recurrent neural network 600, up-sampling is not required (and therefore, not performed) during addition of the at least one data consistency layer as transpose convolution operations address the scale inconsistency problem for which the up-sampling is used. Furthermore, in the trained cascaded recurrent neural network 600, outputs of recurrent neural networks associated with different image scales are concatenated to yield a combined output 602. The combined output 602 is fed as an input into a convolutional neural network 604. An output of the convolutional neural network 604 is a magnetic resonance image 606.

Optionally, the database arrangement 204 is further configured to store at least one of:
  the raw k-space data,
  the sub-sampled k-space data,
  the preliminary image,
  the at least one sub-sampled image,
  the intermediate images generated by at least one recurrent neural network.

Figure 7:
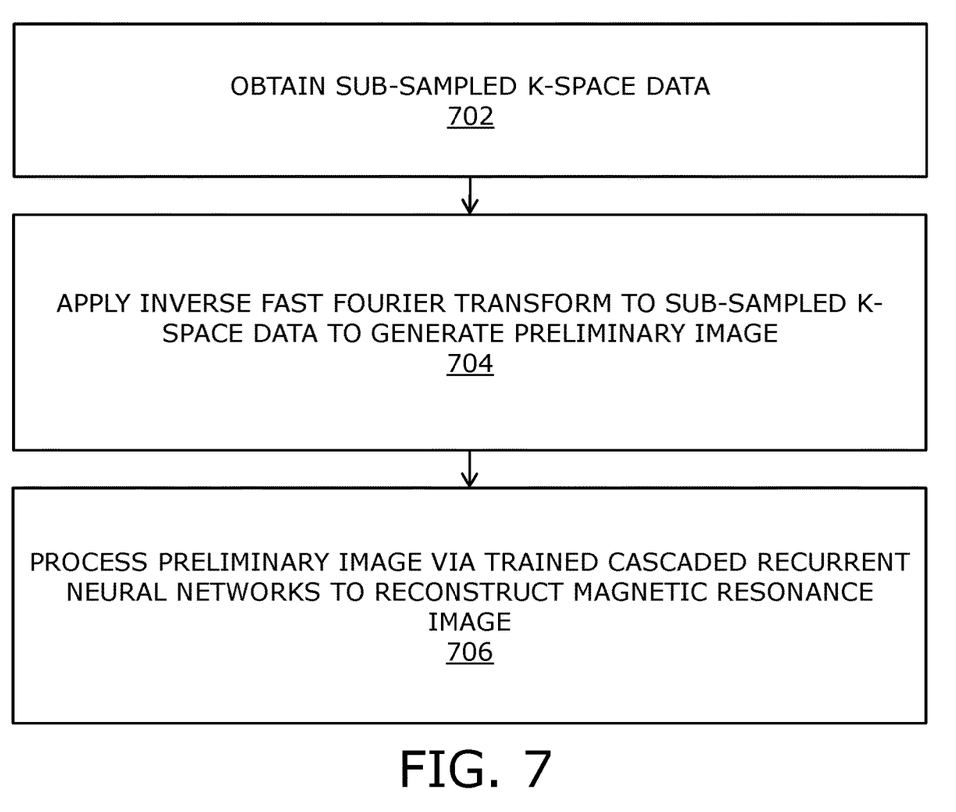
FIG. 7 illustrates steps of a method for reconstructing magnetic resonance images, in accordance with the aspects of the disclosed embodiments.

Referring to FIG. 7, illustrated are steps of a method for reconstructing magnetic resonance images, in accordance with an embodiment of the aspects of the disclosed embodiments.

At step 702, sub-sampled k-space data is obtained from a magnetic resonance scanner. At step 704, an inverse fast fourier transform is applied to the sub-sampled k-space data to generate a preliminary image. At step 706, the preliminary image is processed via a trained cascaded recurrent neural network to reconstruct a magnetic resonance image.

Various embodiments and variants disclosed above, with respect to the aforementioned system (102, 200), apply mutatis mutandis to the method. The method described herein is computationally efficient and does not cause processing burden on the processor (110, 202). The method can be implemented extremely fast, in order to yield high-quality magnetic resonance images with low image acquisition times. The method can therefore be effectively employed in medical imaging applications where low image acquisition times and high image quality is required (for example, in emergency rooms).

Optionally, in the method, the trained cascaded recurrent neural network is associated with at least one image scale, and wherein, for a given image scale of the at least one image scale, wherein the method comprises recursively reconstructing, via a given recurrent neural network, the preliminary image by extracting image features from at least one given image and using the extracted image features to modify the preliminary image.

Optionally, in the method, the trained cascaded recurrent neural network is associated with a plurality of image scales, one recurrent neural network being associated with one image scale, and wherein recurrent neural networks associated with different image scales are serially connected in increasing order of image scales associated therewith.

Optionally, the method further comprises serially feeding an output of a given recurrent neural network associated with a first image scale as an input for a given recurrent neural network associated with a second image scale, the second image scale being subsequent to and greater than the first image scale.

Optionally, the method further comprises concatenating the output of the given recurrent neural network associated with the first image scale with the output of the given recurrent neural network associated with the second image scale to yield a combined output, and feeding the combined output as an input into at least one convolutional neural network.

Optionally, in the method, a number of iterations of a given recurrent neural network are configurable.

Optionally, the method further comprises adding at least one data consistency layer after each iteration of a given recurrent neural network.

Optionally, in the method, the step of adding a given data consistency layer comprises:
up-sampling a size of a given intermediate image to a size of the preliminary image, the given intermediate image being generated as a result of a given iteration of the given recurrent neural network;
applying a fast fourier transform to the given intermediate image;
replacing k-space values corresponding to the given intermediate image using values from the raw k-space data to derive a resultant set of k-space values; and
applying an inverse fast fourier transform to the resultant set of k-space values to generate a next intermediate image.

Optionally, the method further comprises up-sampling or down-sampling a given image, wherein:
the up-sampling is performed using interpolation, or pooling operation, or transpose convolution operation with a given stride, whereas
the down-sampling is performed using interpolation, or pooling operation, or convolution operation with a given stride.

Optionally, the method further comprises storing, at a database arrangement, at least the magnetic resonance image.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

What is claimed is:

1. A system for reconstructing magnetic resonance images, the system comprising:
a processor that is configured to:
obtain, from a magnetic resonance scanner, sub-sampled k-space data;
apply an inverse fast fourier transform to the sub-sampled k-space data to generate a preliminary image; and
process the preliminary image via a trained cascaded recurrent neural network to reconstruct a magnetic resonance image, wherein the trained cascaded recurrent neural network is associated with at least one image scale, and wherein, for a given image scale of the at least one image scale, a given recurrent neural network recursively reconstructs the preliminary image by extracting image features from a given image and using the extracted image features to modify the preliminary image.

2. The system of claim 1, further comprising a database arrangement coupled in communication with the processor, and wherein the database arrangement is configured to store at least the magnetic resonance image that is reconstructed by the processor.

3. The system of claim 1, wherein the trained cascaded recurrent neural network is associated with a plurality of image scales, one recurrent neural network being associated with one image scale, and wherein recurrent neural networks associated with different image scales are serially connected in increasing order of image scales associated therewith.

4. The system of claim 3, wherein an output of a given recurrent neural network associated with a first image scale is serially fed as an input for a given recurrent neural network associated with a second image scale, the second image scale being subsequent to and greater than the first image scale.

5. The system of claim 4, wherein the output of the given recurrent neural network associated with the first image scale is concatenated with the output of the given recurrent neural network associated with the second image scale to yield a combined output, the combined output being fed as an input into at least one convolutional neural network.

6. The system of claim 1, wherein a number of iterations of a given recurrent neural network are configurable.

7. The system of claim 1, wherein the processor is further configured to add at least one data consistency layer after each iteration of a given recurrent neural network.

8. The system of claim 7, wherein, to add a given data consistency layer, the processor is configured to:
up-sample a size of a given intermediate image to a size of the preliminary image, the given intermediate image being generated as a result of a given iteration of the given recurrent neural network;

apply a fast fourier transform to the given intermediate image;

replace k-space values corresponding to the given intermediate image using values from the raw k-space data to derive a resultant set of k-space values; and apply an inverse fast fourier transform to the resultant set of k-space values to generate a next intermediate image.

9. The system of claim 1, wherein the processor is configured to up-sample or down-sample a given image, wherein:

the up-sampling is performed using interpolation, or pooling operation, or transpose convolution operation with a given stride, and the down-sampling is performed using interpolation, or pooling operation, or convolution operation with a given stride.

10. A method for reconstructing magnetic resonance images, the method comprising:

obtaining, from a magnetic resonance scanner, sub-sampled k-space data;

applying an inverse fast fourier transform to the sub-sampled k-space data to generate a preliminary image; and processing the preliminary image via a trained cascaded recurrent neural network to reconstruct a magnetic resonance image, wherein the trained cascaded recurrent neural network is associated with at least one image scale, and wherein, for a given image scale of the at least one image scale, the method comprises recursively reconstructing, via a given recurrent neural network, the preliminary image by extracting image features from a given image and using the extracted image features to modify the preliminary image.

11. The method of claim 10, wherein the method further comprises up-sampling or down-sampling a given image, wherein:

the up-sampling is performed using interpolation, or pooling operation, or transpose convolution operation with a given stride, whereas the down-sampling is performed using interpolation, or pooling operation, or convolution operation with a given stride.

12. The method of claim 10, further comprising storing, at a database arrangement, at least the magnetic resonance image.

13. The method of claim 10, wherein the trained cascaded recurrent neural network is associated with a plurality of image scales, one recurrent neural network being associated with one image scale, and wherein recurrent neural networks associated with different image scales are serially connected in increasing order of image scales associated therewith.

14. The method of claim 13, wherein the method further comprises serially feeding an output of a given recurrent neural network associated with a first image scale as an input for a given recurrent neural network associated with a second image scale, the second image scale being subsequent to and greater than the first image scale.

15. The method of claim 14, wherein the method further comprises concatenating the output of the given recurrent neural network associated with the first image scale with the output of the given recurrent neural network associated with the second image scale to yield a combined output, and feeding the combined output as an input into at least one convolutional neural network.

16. The method of claim 10, wherein a number of iterations of a given recurrent neural network are configurable.

17. The method of claim 10, wherein the method further comprises adding at least one data consistency layer after each iteration of a given recurrent neural network.

18. The method of claim 17, wherein the step of adding a given data consistency layer comprises:

up-sampling a size of a given intermediate image to a size of the preliminary image, the given intermediate image being generated as a result of a given iteration of the given recurrent neural network;

applying a fast fourier transform to the given intermediate image;

replacing k-space values corresponding to the given intermediate image using values from the raw k-space data to derive a resultant set of k-space values; and applying an inverse fast fourier transform to the resultant set of k-space values to generate a next intermediate image.

* * * * *